United States Patent [19]
Yamamoto et al.

[11] Patent Number: 5,032,650
[45] Date of Patent: Jul. 16, 1991

[54] PROCESS FOR PRODUCING A HIGHLY SYNDIOTACTIC STYRENE-BASED POLYMER

[75] Inventors: Koji Yamamoto; Kazutoshi Ishikawa; Hideo Teshima, all of Ichihara, Japan

[73] Assignee: Idemitsu Petrochemical Co., Ltd., Tokyo, Japan

[21] Appl. No.: 491,192

[22] Filed: Mar. 9, 1990

[30] Foreign Application Priority Data

Mar. 30, 1989 [JP] Japan .................................. 1-76496

[51] Int. Cl.$^5$ ............................................. C08F 12/08
[52] U.S. Cl. ........................................ 526/79; 526/86; 526/138; 526/151; 526/159; 526/160; 526/165; 526/346; 526/347.1
[58] Field of Search .................. 526/79, 86, 138, 159, 526/165, 346, 160, 347.1, 151

[56] References Cited

U.S. PATENT DOCUMENTS 4,680,353 7/1987 Ishihara et al. ................. 526/346 X

FOREIGN PATENT DOCUMENTS 0061890 10/1982 European Pat. Off. .
0210615 4/1987 European Pat. Off. ........ 526/346 X
0224097 6/1987 European Pat. Off. .

Primary Examiner—Fred Teskin
Attorney, Agent, or Firm—Frishauf, Holtz, Goodman & Woodward

[57] ABSTRACT

A process for producing a styrene-based polymer having a high syndiotactic configuration, which comprises polymerizing a styrene-based monomer with addition of catalyst in such amounts that the conversion at 30 minutes after the polymerization starts becomes 2 to 50%, and then continuing the polymerization with additions of the catalyst when the conversion exceeds 10%.

According to the process, the productivity can be improved while easily attaining safe running of the reactor and successful controlling of reaction heat.

21 Claims, 2 Drawing Sheets

PROCESS FOR PRODUCING A HIGHLY SYNDIOTACTIC STYRENE-BASED POLYMER

BACKGROUND OF THE INVENTION

1. Field of the Invention

The present invention relates to a process for producing a styrene-based polymer, and more particularly, it relates to a process for an efficient production of a styrene-based polymer having a stereostructure in which the chains of polymers are in a high syndiotactic configuration.

2. Description of the Related Arts

Styrene-based polymers having a stereostructure which is in atactic or isotactic configuration have heretofore been well known, but recently styrene-based polymers having a stereostructure of a high syndiotactic configuration have been developed, one of which is disclosed in Japanese Patent Application Laid-Open No. 187708/1987.

The reaction system, in which styrene-based polymers having syndiotactic configuration are under production, solidifies when the polymerization reaction proceeds to a conversion of approximately 20%, while the reaction continues further until a higher conversion is accomplished. By applying an appropriate shearing force at said solidification stage, polymers in a favorable powder form can be obtained. If the reaction rate at an early stage is too high, however, a large shearing force is required for inhibiting the formation of macro-particles, which is involved in a fear that the inside of the reactor might be wholly covered with solid polymers. There is also a fear of causing a melt-fusion of polymers, since it is difficult to control the reaction heat caused by reaction at a high rate.

On the contrary, if the reaction rate is lowered, for the purpose of inhibiting the formation of macro-particles, it takes much time to complete the polymerization and the production efficiency is lowered.

SUMMARY OF THE INVENTION

An object of the present invention is to provide a process for an efficient production of styrene-based polymers having a syndiotactic configuration without adhesion of the polymers to the reactor or solidification of the polymers into cakes.

Another object of the present invention is to provide a process for an efficient production of styrene-based polymers having a syndiotactic configuration, by the stable running of polymerization with low power consumption.

The present invention provides a process for producing a styrene-based polymer having a high syndiotactic configuration, which comprises polymerizing styrene-based monomers with an addition of catalysts in such amounts that the conversion at 30 minutes after the polymerization starts is 2 to 50%, and subsequently continuing the polymerization with an addition of the catalysts when the conversion exceeds 10%.

DESCRIPTION OF THE PREFERRED EMBODIMENTS

Figure 1:
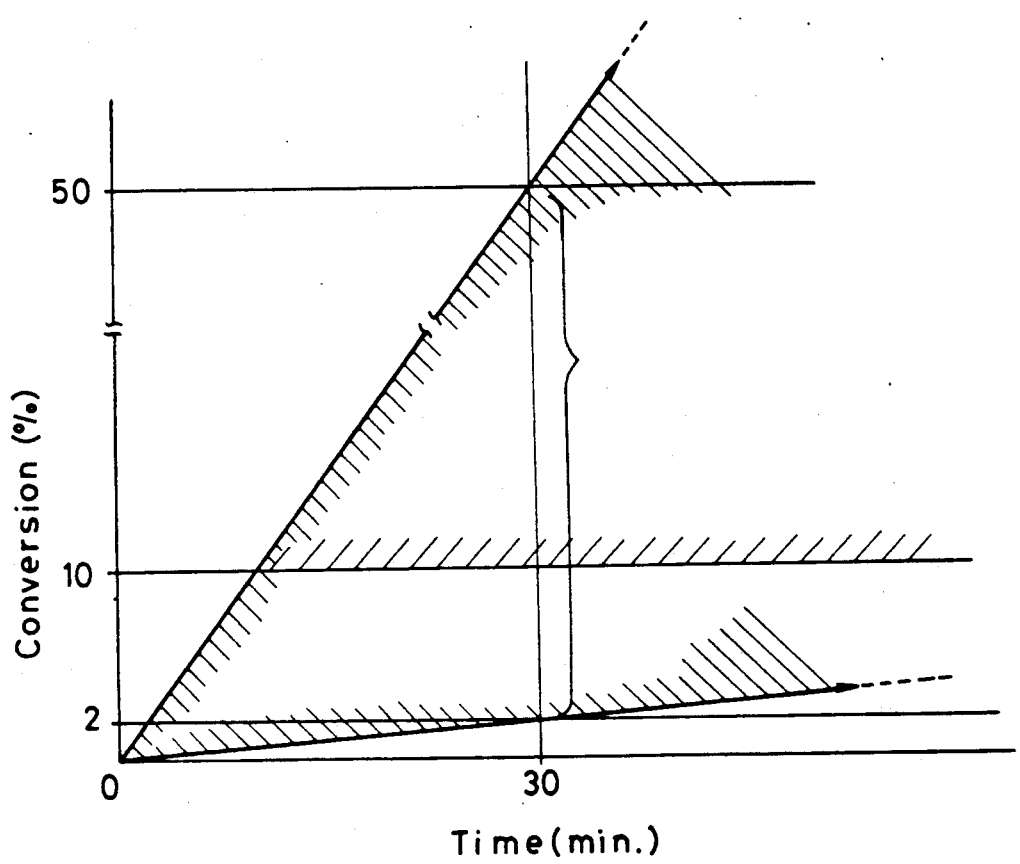
FIG. 1 is a graph which illustrates the range in which the catalyst can be added, and the stage for further addition of the catalyst, in relation with the reaction period and the conversion.

The polymer produced in the present invention is a styrene-based polymer having a high syndiotactic configuration. Therein, the high syndiotactic configuration in the styrene-based polymer means that the polymer has a stereostructure with a configuration that is highly syndiotactic, i.e., the stereostructure in which phenyl groups or substituted phenyl groups as side chains are located alternately at opposite directions relative to the main chain consisting of carbon-carbon bonds. The tacticity is quantitatively determined by the nuclear magnetic resonance method using carbon isotope ($^{13}$C-NMR) method. The tacticity determined by the $^{13}$C-NMR method can be indicated in terms of proportions of structural units continuously connected to each other, i.e., a diad in which two structural units are connected to each other, a triad in which three structural units are connected to each other, or pentad in which five structural units are connected to each other. "Styrene-based polymers having a high syndiotactic configuration" of the present invention includes polystyrene, poly(alkylstyrene), poly(halogenated styrene), poly(alkoxystyrene), poly(vinyl benzoate) and the mixtures thereof, and copolymers containing the above polymers as the main component, having such a syndiotacticity that the proportion of racemic diad is at least 75% and preferably at least 85%, or the proportion of racemic pentad is at least 30% and preferably at least 50%.

The above poly(alkylstyrene) includes poly(methylstyrene), poly(ethylstyrene), poly(isopropylstyrene), poly(tert-butylstyrene) and the like. Specific examples of the poly(halogenated styrene) are poly(chlorostyrene), poly(bromostyrene), poly(fluorostyrene) and the like. The poly(alkoxystyrene) includes poly(methoxystyrene), poly(ethoxystyrene) and the like. The most preferred styrene-based polymers are polystyrene, poly(p-methylstyrene), poly(m-methylstyrene), poly(p-tert-butylstyrene), poly(p-chlorostyrene), poly(m-chlorostyrene), poly(p-fluorostyrene), and a copolymer of styrene and p-methylstyrene.

The styrene-based polymers produced by the present invention generally have a weight average molecular weight of 5,000 or more, preferably 10,000 to 20,000,000, and a number average molecular weight of 2,500 or more, preferably 5,000 to 10,000,000, and have a high syndiotacticity as described above. After polymerization, if the resulting polymer is subjected to a deashing treatment with a washing solution containing hydrochloric acid, etc., and after washing and drying under reduced pressure, further washing with a solvent such as methyl ethyl ketone to remove soluble components and then treating the resulting insoluble components by use of chloroform, etc., depending on necessity, then high purity styrene-based polymers having an extremely high syndiotacticity can be obtained.

The abovementioned styrene-based polymer having a high syndiotactic configuration can be obtained, for example, by polymerizing a styrene-based monomer (corresponding to the desired styrene-based polymer, including styrene and styrene derivatives) with a catalyst comprising a titanium compound and the reaction product of a condensing agent and an organoaluminum compound in the presence or absence of a inert hydrocarbon solvent.

Various titanium compounds can be used as the catalyst therein. A preferred example is at least one compound selected from the group consisting of titanium compounds and titanium chelate compounds represented by the general formula:

$$TiR^1_a R^2_b R^3_c X^1_{4-(a+b+c)}$$

or $$TiR^1_d R^2_e X^1_{3-(d+e)}$$

wherein $R^1$, $R^2$ and $R^3$ are each a hydrogen atom, an alkyl group having 1 to 20 carbon atoms, and alkoxyl group having 1 to 20 carbon atoms, an aryl group having 6 to 20 carbon atoms, an alkylaryl group having 6 to 20 carbon atoms, an arylalkyl group having 6 to 20 carbon atoms, an acyloxyl group having 1 to 20 carbon atoms, a cyclopentadienyl group, a substituted cyclopentadienyl group or an indenyl group, $X^1$ is a halogen atom, a, b and c are each an integer of 0 to 4, and d and e are each an integer of 0 to 3.

In addition, the condensed titanium compounds represented by the general formula:

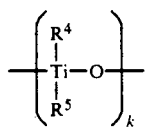

(wherein $R^4$ and $R^5$ are each a halogen atom, an alkoxyl group having 1 to 20 carbon atoms, or an acyloxyl group having 1 to 20 carbon atoms and k is a number of 2 to 20) can be used as the titanium compound.

These titanium compounds can be used as complexes with esters, ethers and the like.

The reaction product which is the main component, as well as the abovementioned titanium compounds, of the catalyst of the present invention, is prepared by contacting an organoaluminum compound and a condensing agent.

As the above organoaluminum compound, various compounds can be applied. Usually trialkylaluminum compounds represented by the general formula:

$$AlR^6_3$$

(wherein $R^6$ is an alkyl group having 1 to 8 carbon atoms) are used.

A typical example of the condensing agent for said organoaluminum is water. In addition, any compounds capable of undergoing a condensation reaction with organoaluminum compounds including alkylaluminum can be used.

A typical example of the reaction product is a reaction product of trialkylaluminum and water, which includes a chain alkylaluminoxane represented by the formula:

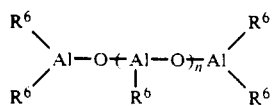

wherein n indicates polymerization degree; and cycloalkylaluminoxane having the repeating unit represented by the general formula:

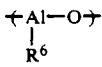

and the like.

Generally, the reaction product of organoaluminum compounds such as trialkylaluminum and water includes the abovementioned chain alkylaluminoxane and cycloalkylaluminoxane, unreacted trialkylaluminum, a mixture of various condensation products, and further complicatedly associated molecules thereof, which become various products according to the contacting conditions of trialkylaluminum and water.

The reaction of the organoaluminum compound and water is not specified, but can be performed according to known methods; for example, (1) a method in which an organoaluminum compound is dissolved in an organic solvent and then contacted with water; (2) a method in which an organoaluminum compound is added at the time of polymerization, and then water is added; and (3) a method in which an organoaluminum compound is reacted with water of crystallization as contained in metal salts and the like, or water absorbed on inorganic or organic compounds.

The above water may contain ammonia, amine such as ethylamine, sulfur compounds such as hydrogen sulfide, phosphorus compounds such as phosphorous ester and so on in the proportion of less than 20%.

As a catalyst, the abovedescribed reaction product can be used singly, or in combination with said organoaluminum compound or with other organometallic compounds, or can be used in the deposited or absorbed form on an inorganic substance, etc.

The amounts of the abovementioned titanium compounds and the reaction product of organoaluminum compound and the condensing agent are optionally set depending on the types of styrenes (styrene or styrene derivatives) as the starting material and the types of catalyst components and other conditions. As the catalyst, also other catalyst components may be added.

In the present invention, addition of these catalysts are performed at least two separate times. The first addition of catalyst can be effected before or at almost the same time said starting material (styrene-based monomer) is placed into the reactor. The amount to be added first depends on the kind of the starting material, kinds of the catalyst, type of the reactor and agitator, temperature of the reaction, and other conditions relating to the polymerization, but it should be selected so that the conversion at 30 minutes after the reaction starts be in the range of 2 to 50%. Therein, if the reaction rate is low level where the conversion at 30 minutes after the reaction starts is under 2%, the reaction period becomes longer and the production efficiency becomes lowered. In contrast, if said conversion exceeds 50%, the reaction rate is so high that macro-particles may undesirably result or temperature control may become difficult.

Subsequently, the second addition of catalyst can be effected at any time so long as the polymerization has proceeded by addition of said first catalyst, and the conversion has exceeded 10%. Said second addition of catalyst, however, is desirably effected at the stage where the conversion is in the range of 15 to 90%. The kind of the catalyst to be added at the second time or thereafter is not critical, but usually the same kind of the catalyst as that of the first addition is preferred. However, the catalyst to be added at the second time or thereafter can be different from the catalyst of the first addition, according to the circumstances.

In the present invention, in case of bulk polymerization, for instance, agitation during the polymerization reaction in the reactor has three stages: i) agitation in a low viscosity state at a polymerization temperature where monomers, oligomers and polymers are in liquid form, a part of polymers are in slurry form without becoming liquid in monomers, or polymers containing other solvents are substantially in liquid form, ii) agitation in a highly viscous state while providing shearing force, as polymerization proceeds, and iii) lastly agitation of a solid-state polydispersoid when substantially the whole has become polydispersive.

In the reactor, the largest agitation force is required in the highly viscous state of (ii). Accordingly, if catalyst is added in such a state, the reaction rate will raise steeply, to require further agitating force, and in an extreme case, the reaction mixture in the system becomes a gel, causing the formation of macro-particles or adhesion of polymers to the reactor or the agitating blades, and consequently, it may be difficult to continue the running of the reactor.

Accordingly, polymerization should preferably proceed with additions of the catalyst in the state of the reactor as described above in (iii), that is, substantially the whole has become polydispersoid. Such a state in the reactor is attained when the conversion in the system exceeds 10%. So, if the catalyst is added after the conversion exceeds 10%, preferably in the range of 15 to 90%, the agitation of the polydispersoid of above (iii) can be continued, and the polymerization can be completed with less power required for agitation.

The amount of catalyst to be added therein is not restricted so long as it is in a sufficient amount to complete the polymerization, but usually it is an amount that the rise in conversion at 30 minutes after the addition of catalyst is not less than 2%, preferably not less than 10%. The larger the amount of catalyst added is, the higher the reaction efficiency becomes, but said amount should be selected appropriately considering the post-treatment process and costs.

The reaction temperature at the said polymerization is not critical so long as it is lower than the temperature at which the polymer is fused, and generally it is set to a temperature of 150° C. or lower.

Herein, the form of the reactor is not restricted, but in the present invention, polymerization proceeds stably and effectively both in batchwise and continuous operation. As the reactor suitable for batchwise operation, a reactor of a tank-type is preferred, and in that case, the agitating blade is not particularly restricted so long as blending and agitating can be sufficiently performed with it. For example, a multi-paddle type, a helical ribbon type and various other types can be used. As the reactor suitable for continuous operation, for example, an extrusion-flow type reactor having a self-cleaning ability can be used. And in the case of continuous operation, a multistage reactor system is available.

On the other hand, to inhibit the formation of macroparticles at the solidifying stage in a polymerization reaction, it is preferred to agitate while applying suitable shearing force. The shearing force to be applied therein is selected properly according to the conditions such as kinds of starting materials, kinds of catalysts, type of the reactor and agitator, temperature at drying, amount of catalyst to be added at the first time, and reaction rate and the like. If the required power ($Pv[kw/L](L=liter)$) is expressed in the relation of power consumption ($P[kw]$) and the amount ($V[L]$) of the starting material to be placed in the reactor (as styrene) as the index of it, in other words, let $Pv=P/V$, a sufficient shearing force can be obtained when Pv is in the range: $0.01 \leq Pv \leq 1.0$. If said shearing force is insufficient, macro-particles may form, and even when the shearing force is in a large amount, it will result in a poor effect.

As described above, according to the present invention, both a factor for reducing the reaction rate, that is, inhibiting the formation of macro-particles and control of the calories generated by polymerization reaction, and a factor for increasing the reaction rate, that is, improvement of productivity can be satisfied, and the productivity can be improved while easily attaining safe running of the reactor and successful controlling of reaction heat.

The present invention is described in greater detail with reference to the following examples and comparative example.

EXAMPLE 1

Figure 2:
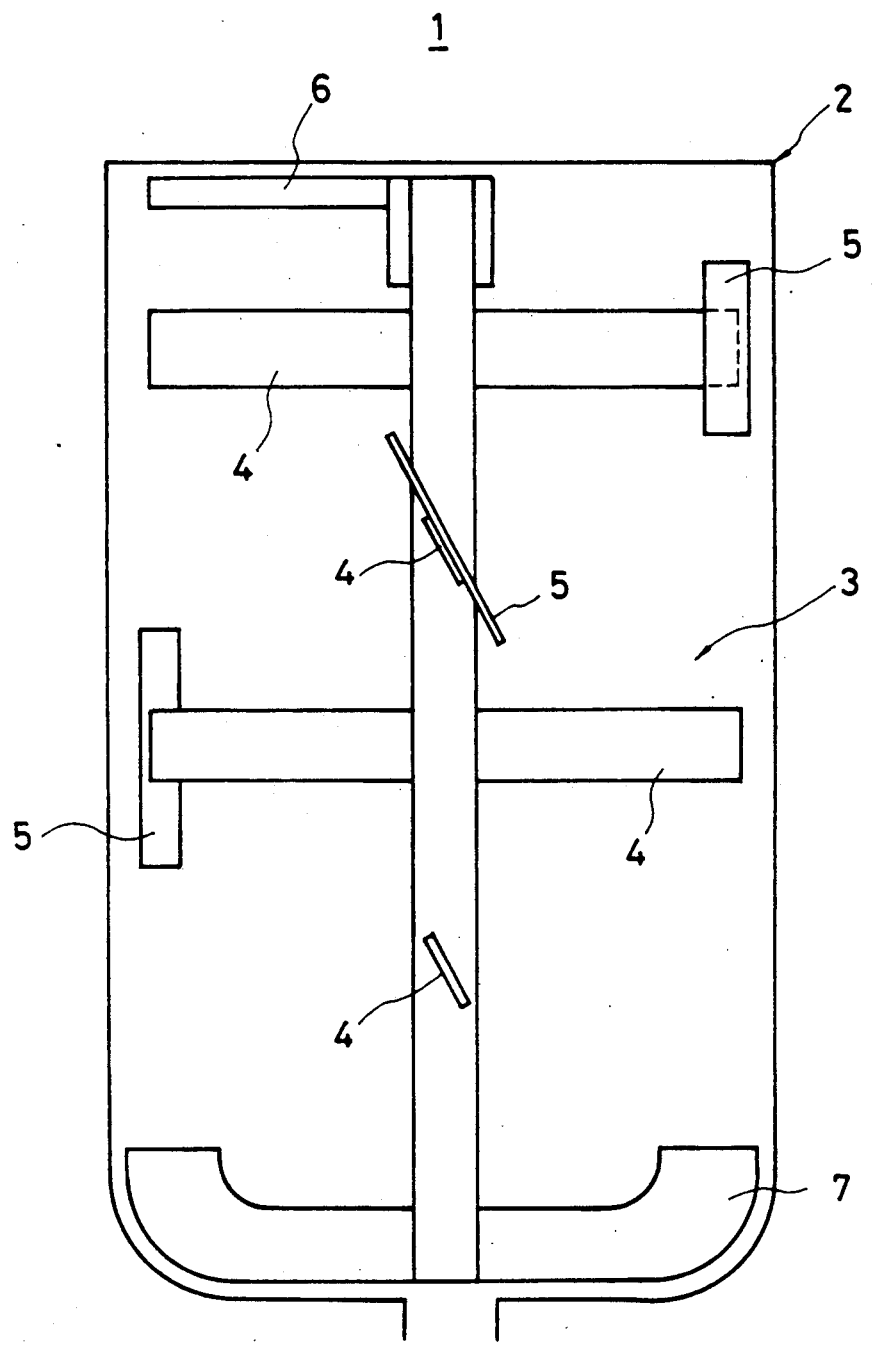
FIG. 2 is an elevational cross sectional view of the apparatus for production 1 used in the Examples and Comparative Example.

Into a tank-type reactor 2 having a capacity of 10 L, a diameter of 200 mm, provided with an agitating blade 3 of multipaddle type with a blade length of 190 mm, a paddle 4 width of 25 mm, a blade angle of 30° (to the axis line), five-paddle blades 4, and an anchor-type paddle 7 as the lowest paddle, a length of the axis line of 290 mm, 230 mm, 170 mm, 108 mm from the bottom (see FIG. 2), and the ends of paddles excepting the lowest two paddles being provided with scrapers 5, 6 having a length of 60 mm (the upper-most scraper 6), 72 mm (the second-tier scraper 5), 85 mm (the third-tier scraper 5), a width of 13 mm, a clearance of 2 mm from the inside wall of tank, 4 L of styrene as the starting material, 40 mmol of triisobutylaluminum, 40 mmol of methylaluminoxane, 0.2 mmol of pentamethylcyclopentadienyltrimethoxytitanium as the catalyst were placed, and reacted at 75° C. for two hours with the agitating blade 3 running at 450 rpm. After the reaction was completed, the conversion of styrene was 30%.

Subsequently, a further 40 mmol of triisobutylaluminum, 40 mmol of methylaluminoxane, 0.2 mmol of pentamethylcyclopentadienyltrimethoxytitanium were added, and subjected to reaction for a further three hours, and then the conversion of styrene was found to be 70%. The resulting styrene polymer (polystyrene) was in a favorable power form having an average particle diameter of 0.3 mm. The weight average molecular weight of said styrene polymer was 623,000, and its syndiotacticity in terms of racemic pentad determined by $^{13}C$-NMR was 98%.

COMPARATIVE EXAMPLE 1

In the same manner as in Example 1, 80 mmol of triisobutylaluminum, 80 mmol of methylaluminoxane, and 0.4 mmol of pentamethylcyclopentadienyltrimethoxytitanium were added as the first addition of catalyst. In other words, when polymerization was started with the same conditions as in Example 1 except that the whole amount of the catalyst added at two separate times in Example 1 were added at the same time as the placement of styrene into the reactor, the inside of the reactor was wholly covered with the adhesion of polymer at 30 minutes after reaction started, and the running turned impossible to continue. The conversion of styrene at that time was 55%.

EXAMPLE 2

The same procedure of Example 1 was repeated except that each amount of the first addition of catalysts was as half as that in Example 1.

As the result, two hours after the polymerization reaction started with the first addition of catalyst, the conversion was 10%. At that time, the second addition of catalyst was effected, and the reaction was continued for three hours, to obtain a conversion of 52%. The resulting polymer was in a favorable powder form. The weight average molecular weight of said styrene polymer was 691,000, and the syndiotacticity in terms of racemic pentad determined by $^{13}$C-NMR was 97.5%.

What is claimed is:

1. A process for producing a styrene polymer having a high syndiotactic configuration, which comprises polymerizing a styrene monomer with a first addition of a catalyst in an amount such that the conversion at 30 minutes after the polymerization starts becomes 2 to 50%, and then continuing the polymerization with a second addition of a catalyst when the conversion exceeds 10%.

2. The process according to claim 1 wherein the catalyst comprises a titanium compound and the reaction product of trialkylaluminum and water and wherein said reaction product comprises alkylaluminoxane.

3. The process according to claim 1 wherein at a second addition of the catalyst or thereafter is effected at the stage where the conversion is in the range of 15 to 90%.

4. The process according to claim 1 wherein the polymerization temperature is 150° C. or lower.

5. The process according to claim 1, wherein the styrene monomer is selected from the group consisting of styrene, alkylstyrene, halogenated styrene, alkoxystyrene, vinyl benzoate and mixtures thereof.

6. The process according to claim 5, wherein the alkylstyrene is selected from the group consisting of methylstyrene, ethylstyrene, isopropylstyrene and tert-butylstyrene.

7. The process according to claim 5, wherein the halogenated styrene is selected from the group consisting of chlorostyrene, bromostyrene and fluorostyrene.

8. The process according to claim 5, wherein the alkoxystyrene is selected from the group consisting of methoxystyrene and ethoxystyrene.

9. The process according to claim 1, wherein the styrene monomer is selected from the group consisting of a p-methylstyrene, m-methylstyrene, p-tert-butylstyrene, p-chlorostyrene, m-chlorostyrene and p-fluorostyrene.

10. The process according to claim 1, wherein the first addition of catalyst is conducted before the styrene monomer is fed to the reactor.

11. The process according to claim 1, wherein the first addition of catalyst is conducted at the same time that the styrene-based monomer is fed to the reactor.

12. The process according to claim 1, wherein the catalyst added at the first addition and at the second addition are the same catalyst.

13. The process according to claim 1, wherein the catalyst added at the first addition and at the second addition are different catalysts.

14. The process according to claim 2, wherein the titanium compound is a titanium chelate compound of the formula:

$$TiR^1_a R^2_b R^3_c X^1_{4-(a+b+c)}$$

or $$TiR^1_d R^2_e X^1_{3-(d+e)}$$

wherein $R^1$, $R^2$ and $R^3$ are each a hydrogen atom, an alkyl group having 1 to 20 carbon atoms, an alkoxyl group having 1 to 20 carbon atoms, an aryl group having 6 to 20 carbon atoms, an alkylaryl group having 6 to 20 carbon atoms, an acyloxyl group having 1 to 20 carbon atoms, an arylalkyl group having 6 to 20 carbon atoms, a cyclopentadienyl group, a substituted cyclopentadienyl group or an indenyl group, $X^1$ is a halogen atom, a, b and c are each an integer of 0 to 4, and d and e are each an integer of 0 to 3.

15. The process according to claim 2, wherein the titanium compound is of the formula:

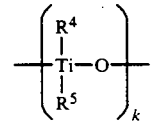

wherein $R^4$ and $R^5$ are each a halogen atom, an alkoxyl group having 1 to 20 carbon atoms, or an acyloxyl group having 1 to 20 carbon atoms and k is a number of 2 to 20.

16. The process according to claim 2, wherein the trialkylaluminum is of the formula $AiR^6_3$, wherein $R^6$ is an alkyl group having 1 to 8 carbon atoms.

17. The process according to claim 1, wherein the process further comprises conducting agitation during said process.

18. The process according to claim 17, wherein the monomer is styrene, the first addition of the catalyst comprises triisobutylaluminum, methylaluminoxane and pentamethylcyclopentadienyltrimethyoxytitanium and the second addition of the catalyst comprises triisobutylaluminum, methylaluminoxane and pentamethylcyclopentadienyltrimethyoxytitanium.

19. The process according to claim 1, wherein the styrene polymer is selected from the group consisting of polystyrene, poly(vinyl benzoate), poly(methylstyrene), poly(ethylstyrene) poly(isopropylstyrene), poly(tert-butylstyrene), poly(chlorostyrene), poly(bromostyrene), poly(fluorostyrene), poly(methoxystyrene), poly(ethoxystyrene) and mixtures thereof.

20. The process according to claim 1, wherein the second addition of the catalyst is effected at a stage where the conversion is 15 to 90% and wherein the polymerization temperature is 150° C. or lower.

21. The process according to claim 2, wherein the second addition of the catalyst is effected at a stage where the conversion is 15 to 90% and wherein the polymerization temperature is 150° C. or lower.

* * * * *

UNITED STATES PATENT AND TRADEMARK OFFICE
CERTIFICATE OF CORRECTION

PATENT NO. : 5,032,650
DATED     : July 16, 1991
INVENTOR(S) : YAMAMOTO et al

It is certified that error appears in the above-identified patent and that said Letters Patent is hereby corrected as shown below:

Column 7, line 36 (Claim 3), change "a" to --the--.

Column 7, line 38, "the" (1st occurrence) should read --a--.

Signed and Sealed this

Twentieth Day of July, 1993

Attest:

MICHAEL K. KIRK

Attesting Officer    Acting Commissioner of Patents and Trademarks